United States Patent
Kang et al.

(10) Patent No.: US 6,370,382 B1
(45) Date of Patent: Apr. 9, 2002

(54) SYSTEM AND METHOD FOR REDUCING WIRELESS TELECOMMUNICATIONS NETWORK RESOURCES REQUIRED TO SUCCESSFULLY ROUTE CALLS TO A WIRELINE NETWORK

(75) Inventors: Sang-Hun Kang; Robert L. Wittenberg, both of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/300,824

(22) Filed: Apr. 27, 1999

(51) Int. Cl.[7] .............................................. H04Q 7/20
(52) U.S. Cl. ........................ 455/445; 455/8; 455/413; 379/266.01; 379/309
(58) Field of Search .................... 455/445, 67.1, 455/423, 424, 8, 9, 413–415, 422; 370/338, 352, 237; 379/221, 220, 209–211, 266, 309, 88.25, 88.26, 209.01, 210.01, 266.01, 266.02, 266.03, 266.06, 221.01, 220.01

(56) References Cited

U.S. PATENT DOCUMENTS

| | | | | |
|---|---|---|---|---|
| 4,284,852 A | * | 8/1981 | Szybicki et al. | 379/221.01 |
| 4,885,780 A | * | 12/1989 | Gopal et al. | 379/221 |
| 5,206,901 A | * | 4/1993 | Harlow et al. | 379/211 |
| 5,311,583 A | * | 5/1994 | Friedes et al. | 379/209 |
| 5,764,644 A | * | 6/1998 | Miska et al. | 370/465 |
| 5,889,839 A | * | 3/1999 | Beyda et al. | 379/88.25 |
| 5,940,763 A | * | 8/1999 | Alperovich et al. | 455/450 |
| 6,014,377 A | * | 1/2000 | Gillespie | 455/445 |
| 6,049,713 A | * | 4/2000 | Tran et al. | 455/445 |

FOREIGN PATENT DOCUMENTS

| | | | | |
|---|---|---|---|---|
| EP | 0582440 | 2/1994 | | H04M/3/48 |
| WO | 9908432 | 2/1999 | | H04M/3/42 |

* cited by examiner

Primary Examiner—Vivian Chang
Assistant Examiner—Eliseo Ramos-Feliciano
(74) Attorney, Agent, or Firm—R. Ben Miller; Christopher Edwards

(57) ABSTRACT

A system for reducing wireless telecommunications network resources required to successfully route calls to a wireline network of the present invention. A first mechanism routes a call originated from a wireless party connected to a wireless network to a wireline party connected to a wireline network. A second mechanism determines if the wireline network is congested in response to the mechanism for routing and provides a signal in response thereto. A third mechanism selectively queues the call in response to the signal. A fourth mechanism connects the wireless party to the wireline party when the call reaches a front of the queue and the wireline network can accept the call. In a specific embodiment, the first mechanism for routing the call includes a mobile switching center in communication with a base station or base station controller. The base station or base station controller communicates with a mobile station associated with the wireless party. The second mechanism includes a mechanism for monitoring if the call is completed and indicating that the network is congested via the signal if the call is not completed. The third mechanism includes software running on the mobile switching center and/or the base station controller that places the call on the queue. The fourth mechanism includes a mechanism for monitoring when the wireline party answers with respect to when the wireless party is notified that the call is about to be completed. The fourth mechanism further includes a mechanism for notifying the wireline party that the wireless party will connect shortly if the wireline party answers the call before the wireless party is notified that the call is to be completed via the fourth mechanism. The fourth mechanism also includes a mechanism for informing the wireline party that the wireless party is unavailable if the wireless party cannot be notified or contacted by the mechanism for connecting.

10 Claims, 2 Drawing Sheets

SYSTEM AND METHOD FOR REDUCING WIRELESS TELECOMMUNICATIONS NETWORK RESOURCES REQUIRED TO SUCCESSFULLY ROUTE CALLS TO A WIRELINE NETWORK

BACKGROUND OF THE INVENTION

1. Field of Invention

This invention relates to wireless communications systems. Specifically, the present invention relates systems and methods for mitigating high wireless busy hour call attempts (BHCA) due to wireline congestion.

2. Description of the Related Art

Wireless communications systems are used in a variety of demanding applications including search and rescue and business applications. Such applications require reliable communications systems that can efficiently route calls to a wireline network during the busiest hour of the day while using a minimum amount of wireless network resources.

Wireless telecommunications systems are characterized by a plurality of mobile stations (e.g. fixed wireless phones or mobile phones) in communication with one or more base stations. A signal transmitted by a mobile station is received by a base station and relayed to a base station controller (BSC). The BSC in-turn routes the signal to another base station, mobile switching center (MSC), or directly to a public switched telephone network (PSTN). Similarly, a signal may be transmitted from the PSTN to a mobile station via a base station and an MSC. The PSTN is often called the landline network or the wireline network. In a wireline network, calls are routed via wire over land rather than over air via radio links.

Each base station governs a limited geographic region called a cell. Typically, the coverage area of a wireless telecommunications system is divided into multiple cells. When a mobile station moves from a first cell to a second cell, a handoff is performed to assign new system resources associated with the second cell to the mobile station.

The wireless network must maintain sufficient resources to accommodate periods of peak telephone usage. Landline congestion often taxes wireless resources. For example, a call attempted via a wireless network to a telephone on the wireline network may require several attempts before the call is connected. The average number of attempts required to complete a call between the wireless network and the wireline network during the busiest hour of the day is known as the busy hour call attempts (BHCA). Typically, a wireless network must have sufficient wireless resources, i.e. bandwidth, software, and hardware, to accommodate the requisite BHCA for call completion.

In telephone markets such as the Indian market or the Sri Lankan market, wireline congestion is particularly problematic. In such markets, the wireless infrastructure must often accommodate as many as 8 BHCA per wireless service subscriber. Typically, to accommodate the requisite call attempts additional resources such as access/traffic channels and associated software and hardware are added to the wireless network. The additional resources are expensive and often require additional expensive engineering and installation work.

The wireless network from which a call originates must Provision resources for each busy call due to wireline congestion. The Provisionary of resources is extremely inefficient and costly. In a market such as the Indian market, the wireless network infrastructure capacity is greatly expanded to accommodate the redundant redialing required to establish a call to a wireline telephone during periods of wireline congestion.

Hence, a need exists in the art for a system and method that reduces the requisite additional wireless infrastructure needed to handle high BHCA and that virtually eliminates the redundant redialing required to establish a call to a wireline telephone during periods of wireline congestion.

SUMMARY OF THE INVENTION

The need in the art is addressed by the system for reducing wireless telecommunications network resources required to successfully route calls to a wireline network of the present invention. The system includes a first mechanism for routing a call originated from a wireless party connected to a wireless network to a wireline party connected to a wireline network. A second mechanism determines if the wireline network is congested in response to the mechanism for routing and provides a signal in response thereto. A third mechanism selectively queues the call in response to the signal. A fourth mechanism connects the wireless party to the wireline party when the call reaches a front of the queue and the wireline network can accept the call.

In a specific embodiment, the first mechanism for routing the call includes a mobile switching center in communication with a base station or base station controller. The base station or base station controller communicates with a mobile station associated with the wireless party. The second mechanism for determining if the wireline network is congested includes a mechanism for monitoring to determine if the call is completed and indicating that the network is congested via the signal if the call is not completed. The third mechanism for selectively queuing the call includes software running on the mobile switching center and/or the base station controller for placing the call on the queue. The software may also run on an external application processor. The fourth mechanism for connecting the wireless party includes a mechanism for monitoring when the wireline party answers with respect to when the wireless party is notified that the call is about to be completed. The fourth mechanism further includes a mechanism for notifying the wireline party that the wireless party will connect shortly if the wireline party answers the call before the wireless party is notified that the call is to be completed via the fourth mechanism. The fourth mechanism also includes a mechanism for informing the wireline party that the wireless party is unavailable if the wireless party cannot be notified or contacted by the mechanism for connecting. In the illustrative embodiment, the system includes an additional mechanism for exchanging recorded messages between the wireless party and the wireline party.

The novel design of the present invention is facilitated by the use of call queuing software running on a mobile switching center or application processor for implementing the first, second, third, and fourth mechanisms and selectively queuing calls in the face of wireline congestion. The selective queuing of calls reduces the need for constant redialing by a wireless party, which eliminates redundant use of wireless network resources to accommodate the redialing. As a result, substantial savings are achieved in terms of wireless infrastructure costs.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
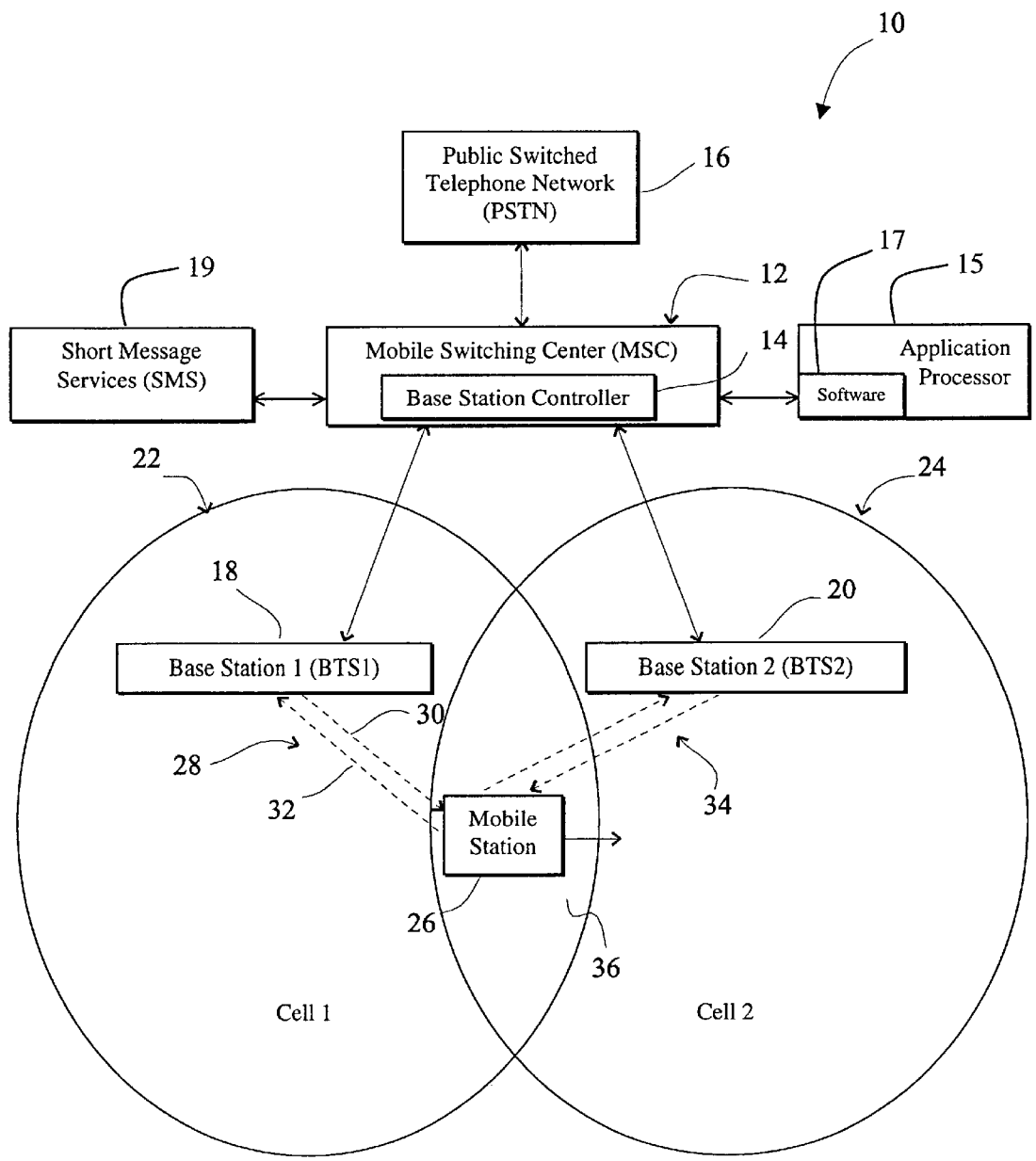
FIG. 1 is a diagram of a wireless communications system constructed in accordance with the teachings of the present invention.

FIG. 1 is a diagram of a wireless communications system 10 constructed in accordance with the teachings of the present invention. The system 10 includes an application processor 15 running special call queuing software 17 of the present invention. The application processor 15 is connected to a mobile switching center (MSC) 12 having a base station controller(s) (BSC) 14. Those skilled in the art will appreciate that the software 17 may be implemented in software running in on the BSC 14 or the MSC 12, in which case the application processor 15 is not needed.

The MSC 12 and BSC 14 communicate with a first base station 18 and a second base station 20 over a T1 or E1 span(s), which may be coaxial cable microwave, fiber optic, or copper. The base stations 18 and 20 are also known as base station transceiver subsystems (BTS) and govern a first cell 22 and a second cell 24, respectively, and communicate with the mobile station 26 via a first air-interface link 28 and a second air-interface link 34, respectively.

A public switched telephone network (PSTN) 16 (also termed a wireline network or a landline network) is connected to the MSC 12 via a switch (not shown) and routes calls from telephone lines and other networks (not shown) to and from the MSC 12. The MSC 12 routes calls from the PSTN 16 to and from the first base station 18 and the second base station 20 associated with the first cell 22 and the second cell 24, respectively. In addition, the MSC 12 routes calls between the base stations 18 and 20. The first base station 18 directs calls to the first mobile station 26 within the first cell 22 via the first communications link 28. The first communications link 28 is a two-way radio link having a forward link 30 and a reverse link 32.

When the mobile station 26 moves from the first cell 22 to the second cell 24, the mobile station 26 is handed off to the target base station 20. Handoff typically occurs in an overlap region 36 where the first cell 22 overlaps the second cell 24.

In a soft handoff, the mobile station 26 establishes a second communications link 34 with the target base station 20 in addition to the first communications link 28 with the source base station 18. After the mobile station 26 has crossed into the second cell 24, it may drop the first communications link 28.

In a hard handoff, the communications link 34 is not established. When the mobile station 26 moves from the first cell 22 to the second cell 24, the link 28 to the source base station 18 is dropped and a new link is formed with the target base station 20.

The special call queuing software 17 detects when incomplete calls are due to the link between the MSC and the PSTN being down or congested. The special call queuing software 17 monitors the MSC 12 and the BSC 14 for incomplete calls originated by the mobile station 26 and directed to a wireline party (not shown) connected to the PSTN 16. Incomplete calls may result from a PSTN power outage, from excessive congestion and traffic, or from other causes. Often, dropped calls result from congestion on the PSTN 16 during the busiest hour of the day.

When the call queuing software 17 determines that a call cannot go through, the software 17 sends a message to the mobile station 26, via the first base station 18 and/or the second base station 20, informing the wireless party using the mobile station 26 that the call was not completed. A feature option is provided by the software 17 running on the application processor 15 via a feature message sent by the software 17 via the MSC 12. The message could be a voice message, a special tone, or a short text message if the infrastructure supports short message services (SMS) via an SMS system 19 connected to the MSC 12, the construction of which is known in the art. The user can subsequently enter a code to place the call on a queue within the application processor 15 so that the call will be completed in-turn as resources become available on the PSTN 16 and the call can be completed.

A queue is a linear first-in/first-out (FIFO) data structure in which calls are removed from the head or front of the queue as the calls are connected. Calls are appended to the rear or tail of the queue as the calls are placed on the queue due to PSTN congestion.

Once the call reaches the front of the queue, the wireless party having the mobile station 26 is informed via a recorded voice message, a page, or a text message originating from the software 17 and sent through the MSC 12, that the call is about to be connected to the wireline party. The wireless party responds to the message and is subsequently connected to wireline party.

Those skilled in the art can easily construct appropriate messages and software routines to implement the present invention. The messages and software routines are application specific and may vary depending on the type of MSC, BSC, PSTN, and base stations employed in the communications system 10. Also, the application processor 15 may be included within the MSC 12 or elsewhere in the system 10 without departing from the scope of the present invention.

In the preferred embodiment, as discussed more fully below, other messages and options may be provided to facilitate the call queuing function provided by the special software 17.

Figure 2:
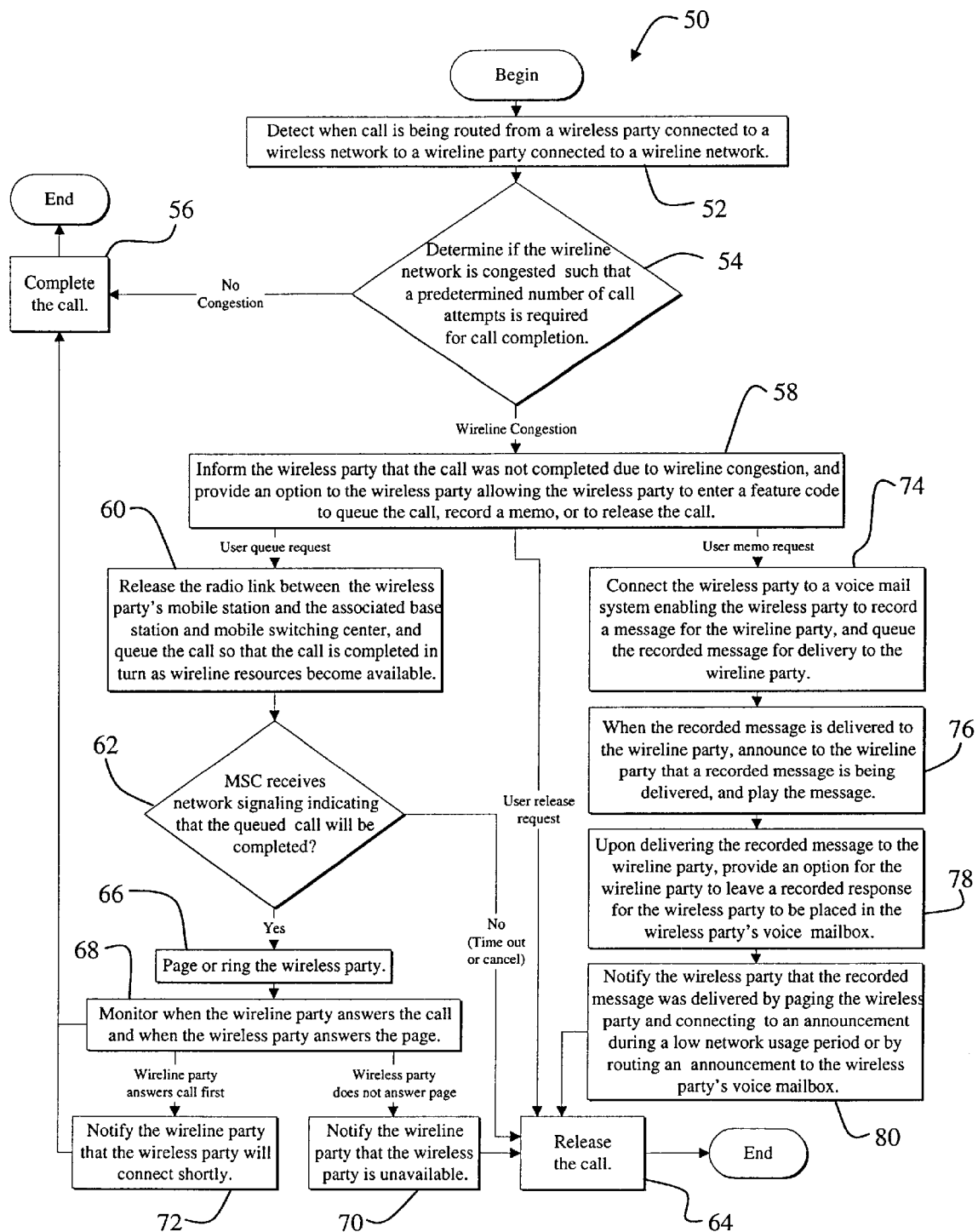
FIG. 2 is a flow diagram of a method for accommodating high busy hour call attempts (BHCA) implemented via the software running on the mobile switching center (MSC) of FIG. 1.

FIG. 2 is a flow diagram of a method 50 for accommodating high busy hour call attempts (BHCA). The method 50 is implemented via the special call queuing software 17 running on the application processor 15 of FIG. 1.

With reference to FIGS. 1 and 2, in an initial call-detection step 52, the special software 17 detects when a call is being routed from a wireless network, such as from the base stations 18 or 20, to a wireline network, i.e., the PSTN 16. In a subsequent congestion-determination step 54, the software 17 determines if the call was dropped by the wireline network 16 or was otherwise unable to connect to the wireline party. If the call can successfully be completed, control is passed to a call-completion step 56 where the call is completed and the method 50 is complete. If the wireline network 16 is congested such that a predetermined number (one or more depending on the BHCA designed for the network) of call attempts may be required for call completion, the control is passed to an incomplete call step 58.

The PSTN 16 may send signaling information to the MSC 12 of the wireless infrastructure 10 indicating that the wireline 16 is congested. The signaling varies according to the type of PSTN switch used by the MSC 12, i.e., a SS7, ISUP, R1, or R2 switch could be used. The MSC 12 may also detect if a span interface (not shown) between the MSC 12 and the PSTN 16 is disconnected. A power outage can result in a disconnected span interface.

In the incomplete call step 58, the wireless subscriber is notified via a tone or an announcement that the call cannot be completed due to wireline congestion. In the incomplete call step 58, the software 17 provides a feature option to the wireless party allowing the wireless party to enter a feature code to queue the incomplete call, to record a memo, or to release the call.

If the call is queued by the subscriber, control is passed to a wireless resource conservation step 60 where the link 28 or 34 between the base station 18 or 20 and the wireless phone is released. The wireless system 10 places the call on a queue so that the call is completed in-turn as wireline resources become available. At anytime the wireless subscriber, i.e., the wireless party may enter an additional feature code to dequeue the call, in which case control is passed to a call-releasing step 64 and wireless resources associated with the call are released.

Subsequently in a queue monitoring step 62, the software 17 monitors the MSC 12 for network signaling events indicating that the call will be completed, i.e., the call has reached the front of the queue and the wireline network 16 has sufficient resources to handle the call.

Some types of wireline networks, i.e., PSTNs do not currently provide a signal indicative of call completion. In these cases, if no error condition occurs, for example, a span interface between the MSC 12 and the PSTN 16 is connected and the PSTN 16 is not suffering from a power outage, the PSTN 16 assumes that the given call will be completed once the call reaches the front of the queue. If an error message occurs, the present invention may note the error, refrain from dequeuing the call or requeue the call and refrain from implementing a subsequent step of notifying the wireless party 66 via a page, a ring, or a text message that the call will complete. Alternatively, an error message may be forwarded to the wireless party.

If in the queue-monitoring step 62, the call is not complete after a predetermined time interval or the wireless party travels outside its coverage area, the software 17 automatically dequeues the call and notifies the wireless party that the call has been dequeued. The predetermined time interval is application specific and can easily be determined for a particular application by those having ordinary skill in the art.

If the call will complete as indicated via network signaling events or other means, control is passed to the step of notifying the wireless party 66. In the step of notifying the wireless party 66, the wireless party is notified via a ring followed by a voice message, or via a page notifying the subscriber that he/she has a short text message, the short text message informing the subscriber that the queued call will complete.

Control is then passed to a timing step 68 where the software monitors when the wireline party answers the call and when the wireless party responds to the call completion notification in the step of notifying the wireless party 66.

If the wireline is connected, but wireless party cannot be connected, control is passed to a disconnect-notification step 70 where the wireline party is notified, via a recorded announcement, that the wireless party is unavailable. Control is subsequently passed to the call-releasing step 64 and the method 50 is complete.

If in the timing step 68, the wireline party answers before the wireless party is paged or otherwise alerted, control is passed to a connect-notification step 72. In the connect-notification step 72, the wireline party is notified via an announcement that the calling party, i.e., the wireless party will connect shortly. Control is subsequently passed to the call-completion step 56 and the method 50 is complete.

Otherwise, if in the timing step 68 the wireless party responds to the notification before the wireline party answers the call, control is passed to the call-completion step 56 and the method 50 is complete.

If in the incomplete call step 58, the wireless party requests a memo, the wireless party is connected to a voice mail system (not shown) in a voice mail connect step 74, where a message can be recorded for the land party. The message is placed on a queue for delivery to the called wireline party. The voice mail system (not shown) is easily implemented via a separate hardware platform by those ordinarily skilled in the art.

Control is subsequently passed to a voice-messaging step 74, where the recorded message is delivered to the wireline party once the message reaches the front of the queue. In the preferred embodiment, an announcement is played to the wireline party indicating that a recorded message is being delivered. The message is subsequently played back and control is passed to an option step 78.

In the option step 78, the wireline party is given an option to leave a recorded response for the wireless party in a voice mailbox associated with the wireless party. Control is then passed to a delivery-notification step 80 wherein the wireless party is notified that the previously recorded voice message, i.e., memo, was delivered to the called wireline party. In the preferred embodiment, the wireless party is notified by ringing the wireless party and connecting the wireless party to an appropriate announcement during an off-peak time or by routing an announcement to the wireless party's voice mailbox. Once the wireless party is notified that the message was delivered or the notification is sent to the wireless party's voice mailbox, control is passed to the call-releasing step 64 and the method 50 is complete.

In the voice-messaging steps 74, 76, 78, and 80, the wireless party can release at any time, such as by turning off the mobile station 26, in which case control is passed to the call-releasing step 64 and the method 50 is complete. However, in the present embodiment, the recorded message is not be dequeued by the user once it is placed on the queue in the voice-messaging step 74. A user option to dequeue the call once it is placed on the queue may be implemented without departing from the scope of the present invention.

Those skilled in the art will appreciate that no new signaling from the PSTN 16 to the MSC 14 is required to implement the present invention. In addition, no new air-interface messages between the mobile station 26 and base station 18 or 20 are required to implement the method 50 of the present invention. The present invention may be implemented entirely within the MSC 12 either in software running on a computer within or connected to the MSC 12 or in hardware within or connected to the MSC 12. In the present embodiment, the method 50 of the present invention is implemented in the special call queuing software 17 running on the application processor 15 of FIG. 1 that is connected to the MSC 12.

Those skilled in the art can easily design and construct requisite Ainterface messages between the mobile MSC and associated BSCs necessary to implement the method of the present invention.

The mobile station 26 does not require additional software to implement the present invention. Feature options as provided in step 58 and associated codes may be implemented in software running on the applications processor 15 (see FIG. 1) with the aid of alerts and announcements and/or short test messages transferred to the mobile station 26 via the application processor 15 and the MSC 12.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

What is claimed is:

1. A system for reducing wireless telecommunications network resources required to successfully route calls to a wireline network comprising:

means for routing a call originated from a wireless party connected to a wireless network to a wireline party connected to a wireline network, including a mobile switching center in communication with a base station or base station controller that is in communication with a mobile station associated with said wireless party;

means for determining if said wireline network is congested in response to said means for routing and providing a signal in response thereto, including means for monitoring if said call is completed and indicating that said network is congested via said signal if said call is not completed;

means for selectively queuing said call in response to said signal, including software running on said mobile switching center and/or said base station controller, or an external processor for placing said call on said queue; and means for connecting said wireless party to said wireline party when said call reaches a front of said queue and said wireline network can accept said call, including means for monitoring when said wireline party answers with respect to when said wireless party is notified that said call is about to be completed and further including means for notifying said wireline party that said wireless party will connect shortly if said wireline party answers said call before said wireless party is notified that said call is to be completed via said means for connecting.

2. The system of claim 1 wherein said means for connecting further includes means for informing said wireline party that said wireless party is unavailable if said wireless party cannot be notified or contacted by said means for connecting.

3. The system of claim 1 further including means for exchanging recorded messages between said wireless party and said wireline party.

4. A wireless telecommunications system for efficiently accommodating wireline network congestion with a minimum amount of wireless infrastructure comprising:

a mobile station;

a base station for communicating with said mobile station;

a controller for communicating with said base station;

a mobile switching center for routing calls between said base station controller, said base station, said mobile station, and wireline network; and means for determining when said wireline network is congested, and placing calls originating from said mobile station and destined to said wireline network on a queue, so that said call is completed in-turn as wireline network resources become available, wherein said means for determining includes means for notifying a user of said mobile station that said call is at or near a front of said queue and is about to be connected to a called party on said wireline network, said means for notifying including means for informing said called party that said user of said mobile station will be connected shortly when said called party answers before said user of said mobile station is notified that said call is about to be connected by said means for notifying.

5. The system of claim 4 wherein said means for determining includes queuing software.

6. The system of claim 5 wherein said queuing software runs on said mobile switching center.

7. The system of claim 5 wherein said queuing software runs on said base station controller.

8. The system of claim 4 wherein said mobile station runs mobile station software for providing a user option to selectively activate said means for determining and an option to dequeue said call.

9. The system of claim 4 wherein said means for determining includes means for providing a user of said mobile station an option to record a memo for delivery to a called party on said wireline network, said memo selectively queued by said means for determining in response to wireline congestion.

10. The system of claim 9 wherein said memo is a voice message and said means for providing further includes a second option allowing said called party to leave a response to said voice message.

* * * * *